(12) United States Patent
Mehta et al.

(10) Patent No.: US 11,418,520 B2
(45) Date of Patent: Aug. 16, 2022

(54) PASSIVE SECURITY ANALYSIS WITH INLINE ACTIVE SECURITY DEVICE

(71) Applicant: Cequence Security, Inc., Sunnyvale, CA (US)

(72) Inventors: Shreyans Mehta, Los Altos, CA (US); Ameya Talwalkar, Saratoga, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 0 days.

(21) Appl. No.: 15/178,965

(22) Filed: Jun. 10, 2016

(65) Prior Publication Data

US 2016/0366161 A1    Dec. 15, 2016

Related U.S. Application Data

(60) Provisional application No. 62/175,585, filed on Jun. 15, 2015.

(51) Int. Cl.
*H04L 9/40* (2022.01)

(52) U.S. Cl.
CPC ...... *H04L 63/1416* (2013.01); *H04L 63/0227* (2013.01); *H04L 63/1433* (2013.01); *H04L 63/1441* (2013.01)

(58) Field of Classification Search
CPC ............. H04L 63/1416; H04L 63/1441; H04L 63/0227; H04L 63/1433
See application file for complete search history.

(56) References Cited

U.S. PATENT DOCUMENTS

| | | | |
|---|---|---|---|
| 7,380,708 B1 | 6/2008 | Kiliccote | |
| 7,784,099 B2 | 8/2010 | Benjamin | |
| 7,814,542 B1 | 10/2010 | Day | |
| 7,984,500 B1* | 7/2011 | Khanna | G06F 21/60 726/22 |
| 8,244,799 B1* | 8/2012 | Salusky | G06F 16/951 709/203 |
| 8,307,099 B1 | 11/2012 | Khanna et al. | |
| 8,646,081 B1 | 2/2014 | Xue et al. | |

(Continued)

FOREIGN PATENT DOCUMENTS

| | | |
|---|---|---|
| JP | 2007-208861 A | 8/2007 |
| JP | 2008-508805 A | 3/2008 |

(Continued)

OTHER PUBLICATIONS

Hooper, Emmanuel; "An Intelligent Intrusion Detection and Response System Using Network Quarantine Channels: Firewalls and Packet Filters", International Conference on Multimedia and Ubiquitous Engineering, IEEE, Apr. 26-28, 2007, 6 pages.*

(Continued)

*Primary Examiner* — Victor Lesniewski (57) ABSTRACT

Techniques to facilitate network security analysis and attack response are disclosed herein. In at least one implementation, a passive analysis system receives a copy of network traffic, performs deep analysis on the copy of network traffic, and generates security data points based on the deep analysis. The passive analysis system then provides the security data points to an active inline security device, wherein the active inline security device compares incoming network traffic to the security data points to detect security events.

20 Claims, 4 Drawing Sheets

(56) References Cited

U.S. PATENT DOCUMENTS

| | | |
|---|---|---|
| 8,819,819 B1 | 8/2014 | Johnston et al. |
| 8,856,869 B1 | 10/2014 | Brinskelle |
| 8,893,270 B1 | 11/2014 | Yang et al. |
| 9,119,109 B1* | 8/2015 | Dubrovsky ......... H04L 47/2433 |
| 9,231,964 B2* | 1/2016 | Cross ................. H04L 63/1416 |
| 9,348,742 B1 | 5/2016 | Brezinski |
| 9,485,262 B1* | 11/2016 | Kahn ................. H04L 63/1416 |
| 9,646,140 B2 | 5/2017 | Horadan |
| 9,749,305 B1 | 8/2017 | Mehr et al. |
| 10,291,589 B1 | 5/2019 | Mehr |
| 2001/0039623 A1* | 11/2001 | Ishikawa ............. H04L 63/1416 726/23 |
| 2002/0099818 A1 | 7/2002 | Russell et al. |
| 2004/0098609 A1 | 5/2004 | Bracewell et al. |
| 2005/0063377 A1* | 3/2005 | Bryant ..................... H04L 43/18 370/389 |
| 2005/0198099 A1* | 9/2005 | Motsinger ............... G06F 21/55 709/200 |
| 2006/0031680 A1 | 2/2006 | Maiman |
| 2006/0117386 A1 | 6/2006 | Gupta et al. |
| 2007/0005648 A1 | 1/2007 | Armanino et al. |
| 2007/0019543 A1* | 1/2007 | Wei ..................... H04L 63/1408 370/229 |
| 2008/0005782 A1* | 1/2008 | Aziz ................... G06F 9/45537 726/3 |
| 2008/0059596 A1* | 3/2008 | Ogawa ............... H04L 63/1416 709/207 |
| 2008/0162679 A1 | 7/2008 | Maher et al. |
| 2008/0209541 A1* | 8/2008 | Dequevy ............. H04L 63/0227 726/14 |
| 2008/0229109 A1 | 9/2008 | Gantman et al. |
| 2010/0125900 A1* | 5/2010 | Dennerline ......... H04L 63/1416 726/13 |
| 2010/0169476 A1* | 7/2010 | Chandrashekar ... H04L 63/1441 709/224 |
| 2010/0191972 A1 | 7/2010 | Kiliccote |
| 2010/0235918 A1* | 9/2010 | Mizrahi .............. H04L 63/1416 726/25 |
| 2010/0281539 A1* | 11/2010 | Burns ................. H04L 63/1441 726/23 |
| 2011/0013527 A1* | 1/2011 | Varadarajan ............ H04L 41/14 370/252 |
| 2011/0154492 A1* | 6/2011 | Jeong ................. H04L 63/1416 726/23 |
| 2011/0185423 A1* | 7/2011 | Sallam .................... G06F 21/56 726/23 |
| 2011/0231924 A1* | 9/2011 | Devdhar ............. H04L 63/0236 726/11 |
| 2011/0239300 A1 | 9/2011 | Klein et al. |
| 2011/0269437 A1 | 11/2011 | Marusi et al. |
| 2011/0283361 A1 | 11/2011 | Perdisci et al. |
| 2012/0144026 A1* | 6/2012 | Conlon ............... H04L 63/1416 709/224 |
| 2012/0240185 A1* | 9/2012 | Kapoor ............... H04L 63/1425 726/1 |
| 2012/0291129 A1 | 11/2012 | Shulman et al. |
| 2013/0031621 A1 | 1/2013 | Jenne et al. |
| 2013/0036472 A1* | 2/2013 | Aziz ................... G06F 9/45537 726/24 |
| 2013/0055375 A1 | 2/2013 | Cline et al. |
| 2013/0097699 A1 | 4/2013 | Balupari et al. |
| 2013/0195457 A1* | 8/2013 | Levy ..................... H04L 47/283 398/66 |
| 2013/0227674 A1 | 8/2013 | Anderson |
| 2013/0315241 A1 | 11/2013 | Kamat et al. |
| 2014/0101764 A1 | 4/2014 | Montoro |
| 2014/0189864 A1 | 7/2014 | Wang et al. |
| 2014/0283067 A1 | 9/2014 | Call et al. |
| 2015/0067472 A1 | 3/2015 | Chen |
| 2015/0096023 A1* | 4/2015 | Mesdaq ............... H04L 63/145 726/23 |
| 2015/0180893 A1* | 6/2015 | Im ...................... H04L 63/1416 726/23 |
| 2015/0180898 A1* | 6/2015 | Liljenstam .............. G06F 21/56 726/23 |
| 2016/0021136 A1* | 1/2016 | McGloin ............. H04L 63/1416 726/23 |
| 2016/0028750 A1* | 1/2016 | Di Pietro ............ H04W 12/125 726/23 |
| 2016/0088001 A1* | 3/2016 | Yeh ........................ H04L 63/20 726/23 |
| 2016/0110549 A1 | 4/2016 | Schmitt |
| 2016/0149953 A1 | 5/2016 | Hidayat |
| 2016/0173526 A1 | 6/2016 | Kasman et al. |
| 2016/0197947 A1* | 7/2016 | Im ...................... H04L 63/1425 726/23 |
| 2016/0241560 A1 | 8/2016 | Reshadi et al. |
| 2016/0241592 A1 | 8/2016 | Kurkure et al. |
| 2016/0308898 A1* | 10/2016 | Teeple ................ H04L 63/1433 |
| 2017/0041334 A1* | 2/2017 | Kahn .................. H04L 63/1416 |
| 2017/0078328 A1 | 3/2017 | McGinnity et al. |
| 2017/0134397 A1 | 5/2017 | Dennison et al. |
| 2018/0026999 A1 | 1/2018 | Ruvio et al. |
| 2018/0115571 A1* | 4/2018 | Kahn .................. H04L 63/1433 |
| 2018/0260565 A1 | 9/2018 | Wang et al. |

FOREIGN PATENT DOCUMENTS

| | | |
|---|---|---|
| JP | 2011-503715 A | 1/2011 |
| JP | 2017-566003 | 3/2011 |
| WO | 2014/021863 A1 | 2/2014 |
| WO | 2014/042645 A1 | 3/2014 |

OTHER PUBLICATIONS

Salehi, Hamed; Shirazi, Hossein; Moghadam, Reza Askari; "Increasing overall network security by integrating Signature-Based NIDS with Packet Filtering Firewall", International Joint Conference on Artificial Intelligence, IEEE, Apr. 25-26, 2009, pp. 357-362.*

Chaudhary, Ajay; Sardana, Anjali; "Software Based Implementation Methodologies for Deep Packet Inspection", International Conference on Information Science and Applications, IEEE, Apr. 26-29, 2011, 10 pages.*

Takahiro Hamada, Yuminobu Igarashi, Hideo Kitzume, Network System for Home Network Security in Cloud, IEICE Technical Report, The Institute of Electronics, Information and Communication Engineers, Sep. 4, 2014, vol. 114, No. 207, p. 105-110.

* cited by examiner

PASSIVE SECURITY ANALYSIS WITH INLINE ACTIVE SECURITY DEVICE

RELATED APPLICATIONS

This application claims the benefit of, and priority to, U.S. Provisional Patent Application No. 62/175,585, entitled "PASSIVE SECURITY ANALYSIS WITH INLINE ACTIVE SECURITY DEVICE", filed Jun. 15, 2015, which is hereby incorporated by reference in its entirety for all purposes.

TECHNICAL BACKGROUND

Web servers that provide web services are often subject to automated attacks, such as using stolen credentials to fraudulently access the service, brute-force attacks that try several username and password combinations to gain access, registering fake accounts, scraping websites to harvest web data, and others. Such velocity attacks typically require a large number of transactions with the web service in a very short period of time, and commonly used web browsers are prohibitively slow for such large-scale and high-speed communications. Instead, attackers use a wide variety of attack tools, ranging from simple shell scripts to sophisticated custom tools designed to speed up transactions.

Various types of network security devices work to protect web services and their components from being attacked by malicious actors, such as firewalls, intrusion prevention systems, and the like. Such devices inspect network traffic at varying degrees of depth, typically by matching incoming traffic data with a library of patterns and network protocol analyzers. Security researchers typically update this pattern library continuously based on analysis of malware behavior at the network level. The larger the set of patterns and protocol analyzers, the longer it takes for network security devices to inspect network traffic. Consequently, this screening process introduces latency in the overall communication between the end user and the web service, which negatively impacts the user experience. As a result, security devices often compromise on the depth of detection in order to minimize the time taken to inspect network traffic.

OVERVIEW

Provided herein are systems, methods, and software to facilitate network security analysis and attack response. In at least one implementation, a passive analysis system receives a copy of network traffic, performs deep analysis on the copy of network traffic, and generates security data points based on the deep analysis. The passive analysis system then provides the security data points to an active inline security device, wherein the active inline security device compares incoming network traffic to the security data points to detect security events.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various to form multiple variations of the invention. As a result, the invention is not limited to the specific examples described below, but only by the claims and their equivalents.

Firewalls, intrusion prevention systems, web application firewalls, and other types of network security devices protect web services from velocity attacks, unauthorized usage, and other intrusions. These security devices analyze network traffic at varying degrees of depth. For example, firewalls typically inspect information in network layer 2 (Ethernet), layer 3 (Internet Protocol), and layer 4 (Transmission Control Protocol/User Datagram Protocol) in the network data. Intrusion prevention and web application firewall solutions often perform deep packet analysis that may involve inspecting every byte of a particular network stream. However, deeper analysis introduces higher latency, so inline devices that actively scan network traffic often compromise on the depth of analysis to achieve low-latency performance requirements.

Due to the latency concerns, inline network security devices are unable to offer certain advanced types of mitigation solutions. For example, solutions that require deep analysis of patterns of behavior by users and their devices interacting with a web service are prohibitively time consuming and thus not provided by inline security devices. Instead, this functionality is typically deployed in offline systems that process historical network data and perform their analysis in an offline mode to detect malicious or abnormal patterns of usage. Because of the nature of their deployment and the latency involved, this offline analysis of historical data fails to offer any active mitigation to the threats detected. Instead of immediate action, human operators typically employ a very slow and manual process of translating the detections into some basic and limited mitigation rules for deployment in load balancers, firewalls, intrusion prevention systems, web application firewalls, and the like. Advantageously, the following disclosure enables low-latency active inline mitigation of network security threats using pattern matching based on complex and time-consuming analysis of network data.

Implementations are disclosed herein to facilitate network security analysis and attack response. In at least one implementation, a passive analysis system receives a copy of network traffic and performs very deep analysis on the data, including looking for malicious patterns of behavior by users, their devices, and applications. The passive analysis system then generates data points that can be used by an active inline security device to take immediate action on similar traffic. In some implementations, the data points may be asynchronously fed over a high speed communication bus into an active inline security device. Incoming traffic is ingested by the active inline device and compared against the data points to detect security events and take mitigating action, while still maintaining the low latency standards that are expected of typical network security devices.

Figure 1:
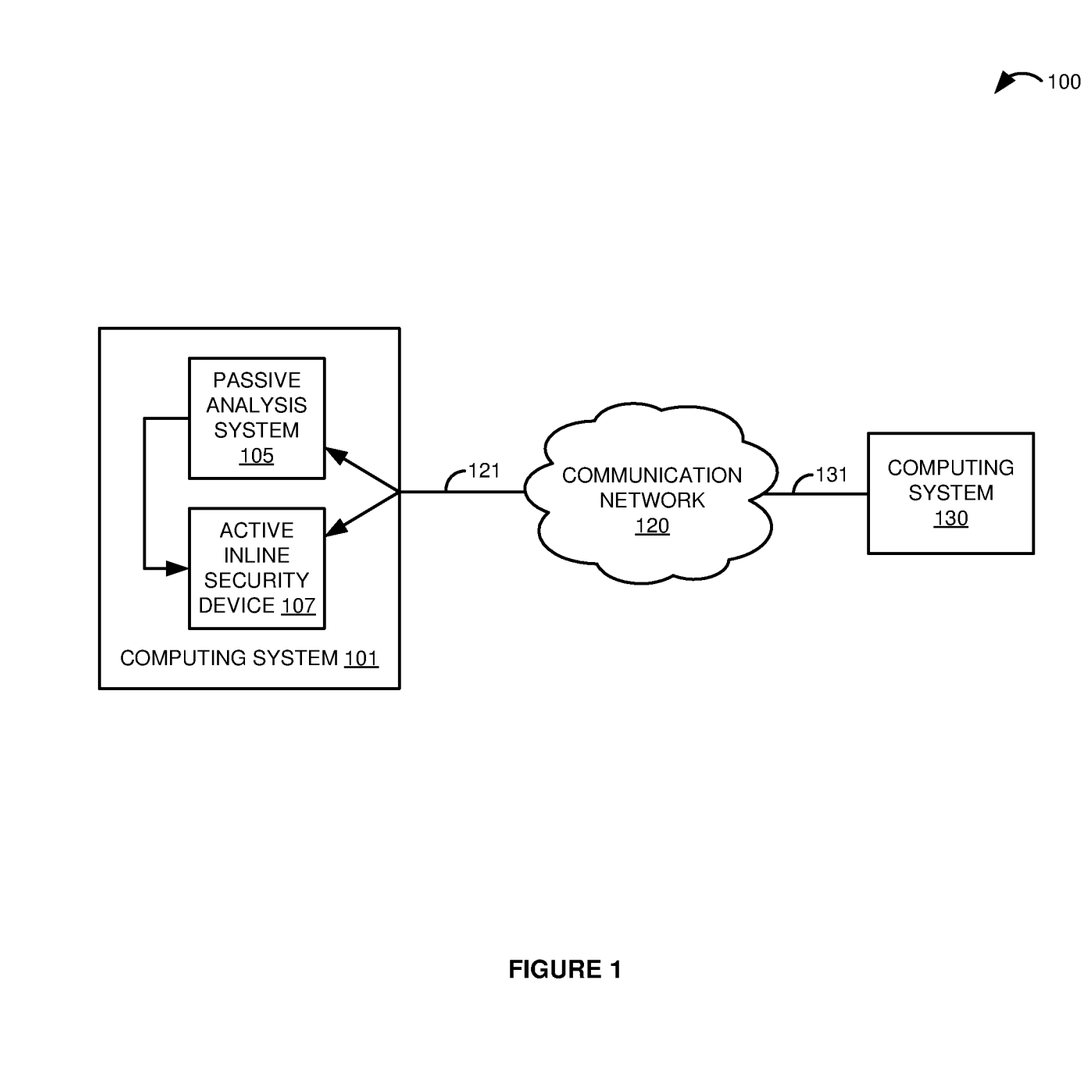
FIG. 1 is a block diagram that illustrates a communication system.

Referring now to FIG. 1, a block diagram of communication system 100 is illustrated. Communication system 100 includes computing system 101, communication network 120, and computing system 130. Computing system 101 includes passive analysis system 105 and active inline security device 107. Passive analysis system 105 and active inline security device 107 provide separate functionality and could be included as different modules within the same hardware apparatus of computing system 101, but could be run in separate dedicated central processing unit, operating system, and memory containers within computing system 101 in some examples. Passive analysis system 105 and active inline security device 107 can also individually reside on two separate hardware appliances that together may be referred to as computing system 101 in some implementations. Computing system 101 and communication network 120 communicate over communication link 121. Communication network 120 and computing system 130 are in communication over communication link 131. An exemplary operation of communication system 100 will now be described with respect to FIG. 2.

Figure 2:
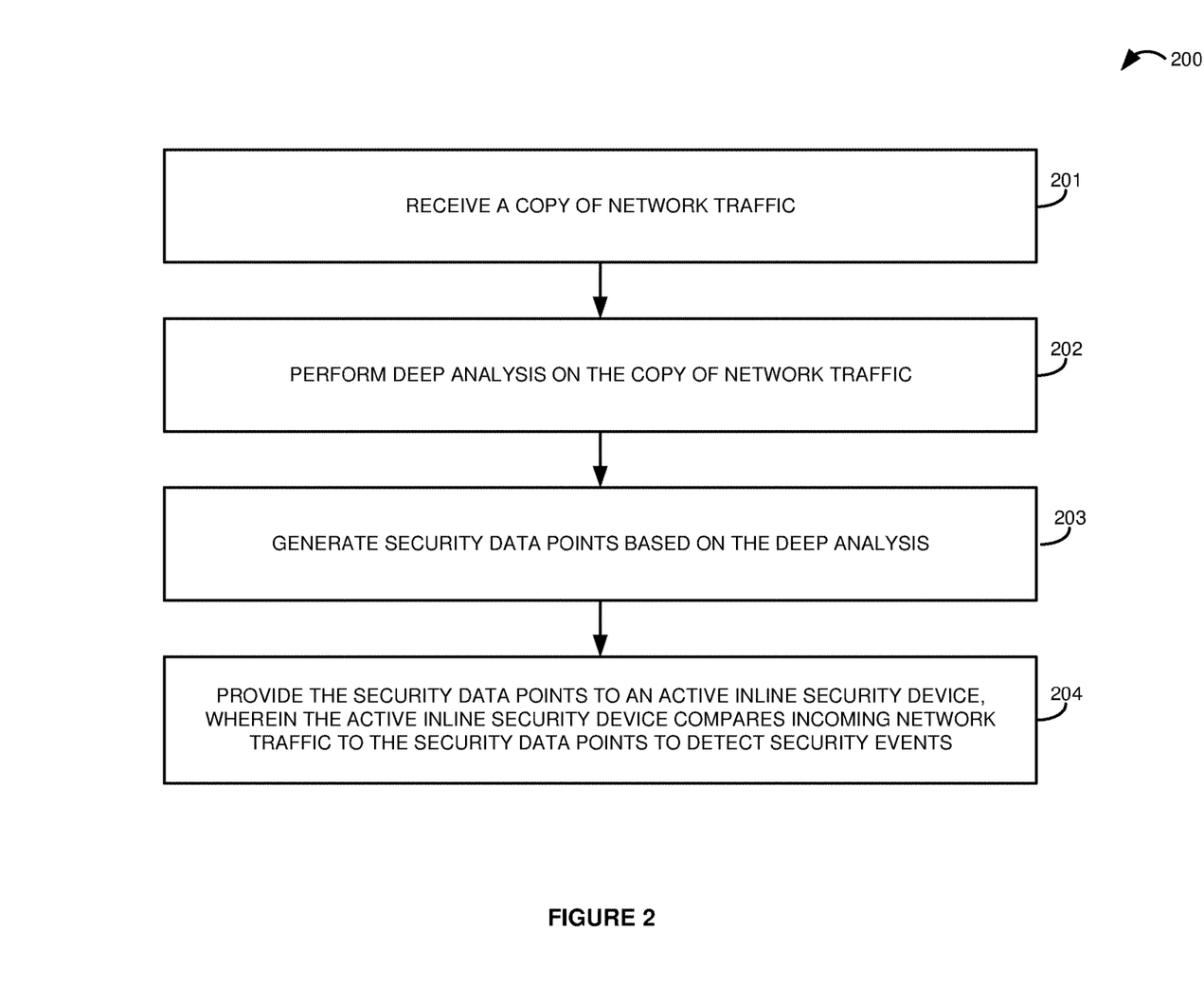
FIG. 2 is a flow diagram that illustrates an operation of the communication system.

FIG. 2 is a flow diagram that illustrates an operation of communication system 100 in an exemplary implementation. The operation 200 shown in FIG. 2 may also be referred to as security process 200 herein. The steps of the operation are indicated below parenthetically. The following discussion of operation 200 will proceed with reference to computing systems 101 and 130 of FIG. 1 in order to illustrate its operations, but note that the details provided in FIG. 1 are merely exemplary and not intended to limit the scope of process 200 to the specific implementation of FIG. 1.

Operation 200 may be employed by computing system 101 to facilitate network security analysis and attack response. In some implementations, computing system 101 could comprise a network security appliance that monitors network traffic and mitigates detected security threats. For example, active inline security device 107 of computing system 101 could intercept network traffic en route to its final destination, which could be computing system 101, computing system 130 or any other computing system, a cloud server, or any other computing resource. In some examples, computing system 101 could comprise a web server used in the provision of a web service, where active inline security device 107 receives and analyzes network traffic from a plurality of users, such as computing system 130, before delivering it to the web service.

As shown in the operational flow of FIG. 2, passive analysis system 105 receives a copy of network traffic (201). The actual network traffic is typically received by active inline security device 107 as discussed above, so a copy of the network traffic is provided to passive analysis system 105 for processing. Because passive analysis system 105 receives a copy of the network traffic, any latency introduced by analyzing this data will not impact the packet flow rate of the actual network traffic.

Passive analysis system 105 performs deep analysis on the copy of network traffic (202). In at least one implementation, performing deep analysis on the copy of network traffic comprises detecting malicious patterns of behavior. For example, passive analysis system 105 could analyze historical patterns of usage in the copy of the network traffic to identify malicious patterns of behavior by users, applications, devices, and others. Passive analysis system 105 may also analyze the copy of network traffic against a library of threat patterns to detect security threats. In some implementations, performing deep analysis on the copy of network traffic could include analyzing the copy of the network traffic for protocol violations. Passive analysis system 105 can detect large velocity attacks by analyzing behavioral patterns, which are typically identified in streams of packets over time. Some exemplary behavior that may be identified by passive analysis system 105 includes the length of time a connection persists, transitions from idle to active on a connection, frequency of requests sent from an endpoint, header information associated with a request, or any other context al or behavioral data observable from interactions with a remote computing system 130.

Passive analysis system generates security data points based on the deep analysis (203) The security data points provide active inline security device 107 the information necessary to take mitigating action. For example, the security data points could comprise IP address whitelists, blacklists, regular expressions, fingerprints of behavior, data models, or any other information that may be matched against similar traffic, including combinations thereof. In some implementations, the security data points may describe the unique form and behavior of the interactions that clients make with computing system 101 as determined from analyzing the network traffic.

In examples where the network traffic comprises a hypertext transfer protocol (HTTP) request that purports to originate from a web browser, passive analysis system 105 could generate security data points based on fields in the HTTP request header and connection behavior of the client. For example, information in the request header could be compared to known headers of common browsers to help validate a request, such as the order of fields in the request header, the presence or absence of particular fields, the values of the fields, including the protocols, languages, media types, compression algorithms, and other features that the browser supports, new capabilities that appear in newer versions of a browser that were present in older versions, and any other information that can be gleaned from the request header.

Continuing this example, passive analysis system 105 may also analyze the connection behavior and the interactions that the client system makes with the web server. Web browsers may interact with a web server in different ways. For example, some browsers choose to send multiple HTTP requests in the same TCP connection, while others create a new connection for every request. Some browsers send multiple requests in the same connection even before they start receiving responses from the server, while others wait to send subsequent requests in the same connection until a response to an initial request on that connection is returned. In certain cases, browsers may choose to keep a connection or multiple connections open for a period of time, even if there are no active requests or responses in transit. In other words, the length of time that a connection persists, even though no data may be flowing over that connection, can differ between the various types and versions of web browsers. Other behavior of the web client could be determined as well, such as the order and manner in which the client parses the hypertext markup language (HTML) and other code when fetching a web page. For example, when parsing HTML, some browsers will parse hyperlinks and other textual content in a different way than images or video, such as fetching all images first, or processing all JavaScript code first before fetching images, or fetching images with a different connection than other page content, and any other nuances in HTML parsing and content fetching. Any of the above information in the HTTP header, connection behavior, and other data that can be observed from the interactions f the client system with the web server can be used to generate the security data points based on the deep analysis of network usage and connection behavior.

Passive analysis system 105 provides the security data points to active inline security device 107, wherein active inline security device 107 compares incoming network traffic to the security data points to detect security issues (204). Typically, the security data points received from passive analysis system 105 may be stored in a database for use in the comparison. In at least one implementation, to provide the security data points to active inline security device 107, passive analysis system 105 asynchronously feeds the security data points to active inline security device 107. Passive analysis system 105 typically provides the security data points to active inline security device 107 over a high speed communication bus, although active device 107 could receive the security data points in other ways. Active inline security device 107 performs a match function that compares incoming network traffic to the security data points to detect security issues and take action. For example, active inline security device 107 could match malicious connection behavioral patterns to the incoming network traffic using the security data points and help mitigate threats by blocking the malicious traffic. Active inline security device 107 typically blocks packets or employs some other countermeasures upon detection of at least one security event.

Advantageously, passive analysis system 105 monitors web traffic and interactions between users and a web service using deep analysis to generate security data points for active inline security device 107. By comparing the security data points to incoming traffic, active inline security device 107 can detect malicious network behavior and take mitigating action. By securing the web service from malicious use, the techniques described herein provide the technical advantage of reducing the load on the processor, network components, and other elements of communication system 100 by eliminating illegitimate requests, while also safeguarding the information of users of the web service. Further, because the deep analysis and processing of the network traffic is handled transparently by passive analysis system 105, the endpoints of the communication transmission are unaware of the additional security measures and validation that occurs to safeguard the information exchange. In this manner, passive analysis system 105 enables deep and complex analysis of network traffic which can be used to effectively thwart attacks on web services by active inline security device 107 without impacting network latency or user experience.

Figure 3:
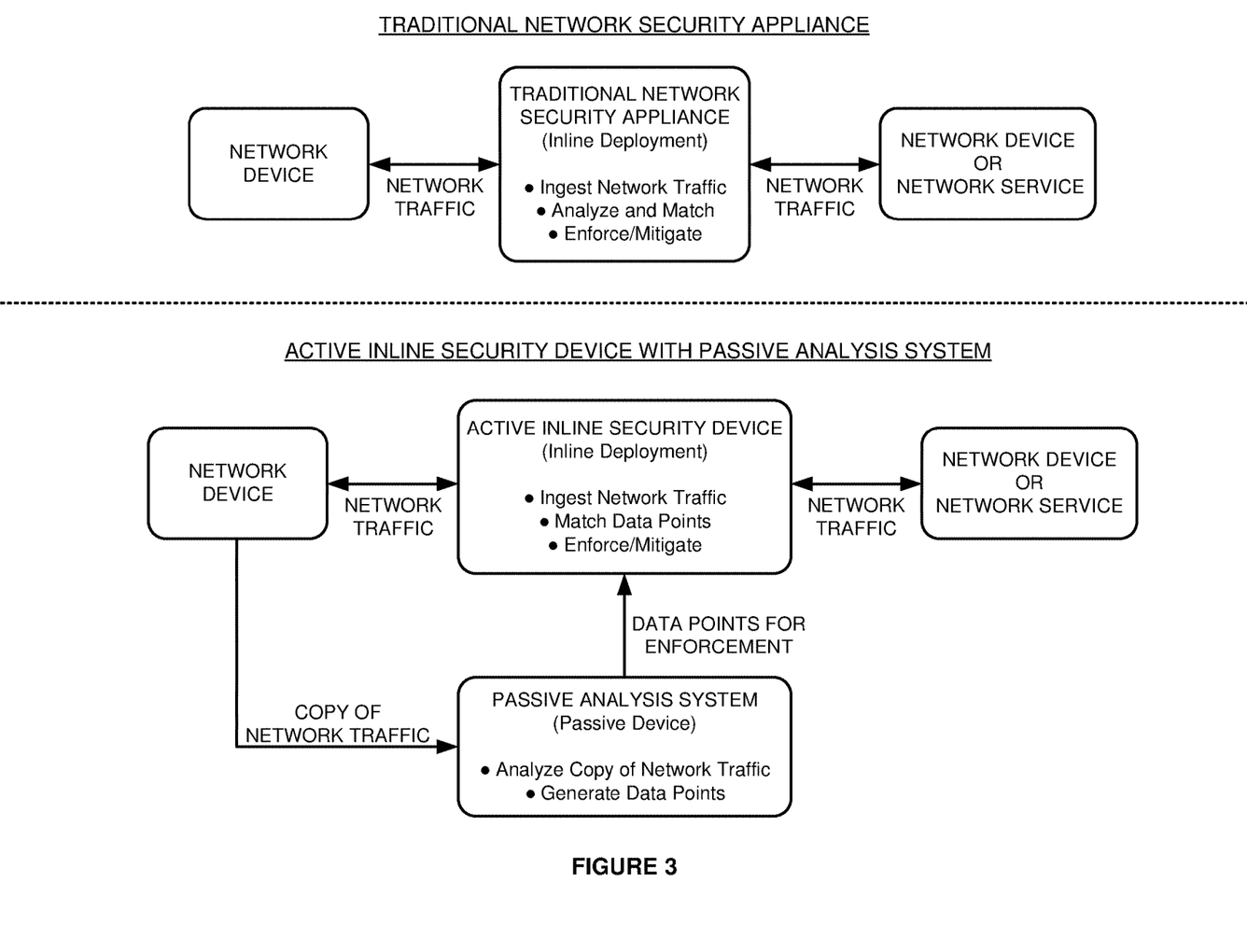
FIG. 3 is a flow diagram that illustrates an operation of a communication system in an exemplary embodiment.

Referring now to FIG. 3, a flow diagram is illustrated of an operation of a communication system an exemplary embodiment. The techniques described in FIG. 3 could be executed by the devices of communication system 100 such as computing systems 101 and 130, and could be combined with operation 200 of FIG. 2 in some implementations. FIG. 3 is divided into two sections, separated by a dotted line. The top portion of FIG. 3, labeled "Traditional Network Security Appliance", illustrates a typical, inline deployment of a security appliance between a network device and another network device or network service. The inline network device performs three functions: ingest network traffic, analyze and match, and enforce or mitigate. The 'Ingest' module receives network packets over a network from one or more connected computing devices. The 'Analyze and Match' module looks for malicious network traffic, typically by processing network packets against a library of protocol analyzers to detect protocol violations. The 'Enforce/Mitigate' module takes action if malicious activity is detected, which could include blocking packets from reaching their destination or terminating network connections. Of these three modules, the 'Analyze & Match' module takes the longest amount of time, and deeper analysis during this phase is directly correlated to increased latency and degraded user experience. This traditional network security appliance has a very short maximum latency that it can impose on the traffic while holding packets and performing analysis, so there is no time for complex analysis and pattern matching.

Turning now to the lower portion of FIG. 3, labeled "Active Inline Security Device With Passive Analysis System", the traditional network security appliance is split into an active inline security device and a passive analysis system. The 'Analyze and Match' module of the traditional network security appliance above is effectively split between the passive analysis system and the active inline security device, with additional enhanced functionality added to both. In particular, since the passive analysis system works with a copy of the network traffic and is no longer inline with the real time data flow, the passive analysis system can perform very deep analysis of the network traffic, including looking for malicious patterns of behavior by users, applications, and devices, without regard for latency. The passive analysis system also generates data points that can be used by the 'Match' module in the active inline security device to take mitigating action on similar traffic. The data points typically describe patter s of usage and behavior exhibited by malicious users, applications, devices, and other systems, and may further identify these malicious entities in IP blacklists in some examples.

The active inline security device is enhanced with the ability to process the data points received from the passive analysis system, which are typically communicated rapidly over a high speed communication bus. The active inline security device performs pattern matching between the data points and the incoming network traffic it receives in the 'Ingest' module to detect security events. The pattern matching can be performed quickly by the active inline device to comply with maximum latency restrictions for inline devices. In the event of a match, the 'Enforce/Mitigate' module takes appropriate e action to address the detected threat. In this manner, the 'Ingest', 'Match', and 'Enforce' modules that are part of the active inline security device do not burden the active device with lengthy delays while holding network packets for processing. Instead, the passive analysis system performs the more time-consuming deep analysis and pattern detection, feeding data points to the 'Match' module of the active inline device as they are generated. The active inline security device ingests incoming network traffic and matches the data points it receives from the passive analysis system against the traffic to detect and mitigate malicious behavior. Thus, in combination, the passive analysis system provides deep and complex analysis of network traffic and usage patterns to generate data points for use in an inline a live device to mitigate threats without impacting network latency or user experience.

The security techniques described above provide for deep analysis of network traffic with automated mitigation by applying mitigation rules on a rich set of attributes for high accuracy. Any suspicious activity that matches patterns in the data points generated by the passive analysis system can be flagged and blocked by the active inline device, thereby providing improved defenses against malicious actors.

Now referring back to FIG. 1, computing system 101 may be representative of any computing apparatus, system, or systems on which the techniques disclosed herein or variations thereof may be suitably implemented. Computing system 101 comprises at least one processing system and a communication transceiver. Computing system 101 may also include other components such as a user interface, data storage system, and power supply. Computing system 101 may reside in a single d wine or may be distributed across multiple devices. Computing system 101 may be a discrete system or may be integrated within other systems, including other systems within communication system 100. Computing system 101 provides an example of a computing system that could be used as a either a server or a client device in some implementations, although such devices could have alternative configurations. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some examples, computing system 101 could comprise a network security appliance, firewall, load balancer, intrusion prevention system, web application firewall, web server, network switch, router, switching system, packet gateway, network gateway system, Internet access node, application server, database system service node, or some other communication equipment, including combinations thereof.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format, including combinations thereof. In some examples, communication network 120 includes further access nodes and associated equipment for providing communication services to several computer systems across a large geographic region.

Computing system 130 may be representative of any computing apparatus, system, or systems that may connect to another computing system over a communication network. Computing system 130 comprises at least one processing system and a communication transceiver. Computing system 130 may also include other components such as a router, server, data storage system, and power supply. Computing system 130 may reside in a single device or may be distributed across multiple devices. Computing system 130 may be a discrete system or may be integrated within other systems, including other systems within communication system 100. Some examples of computing system 130 include desktop computers, server computers, cloud computing platforms, and virtual machines, as well as any other type of computing system, variation, or combination thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format, including combinations thereof. Communication links 121 and 131 could be direct links or may include intermediate networks, systems, or devices.

Figure 4:
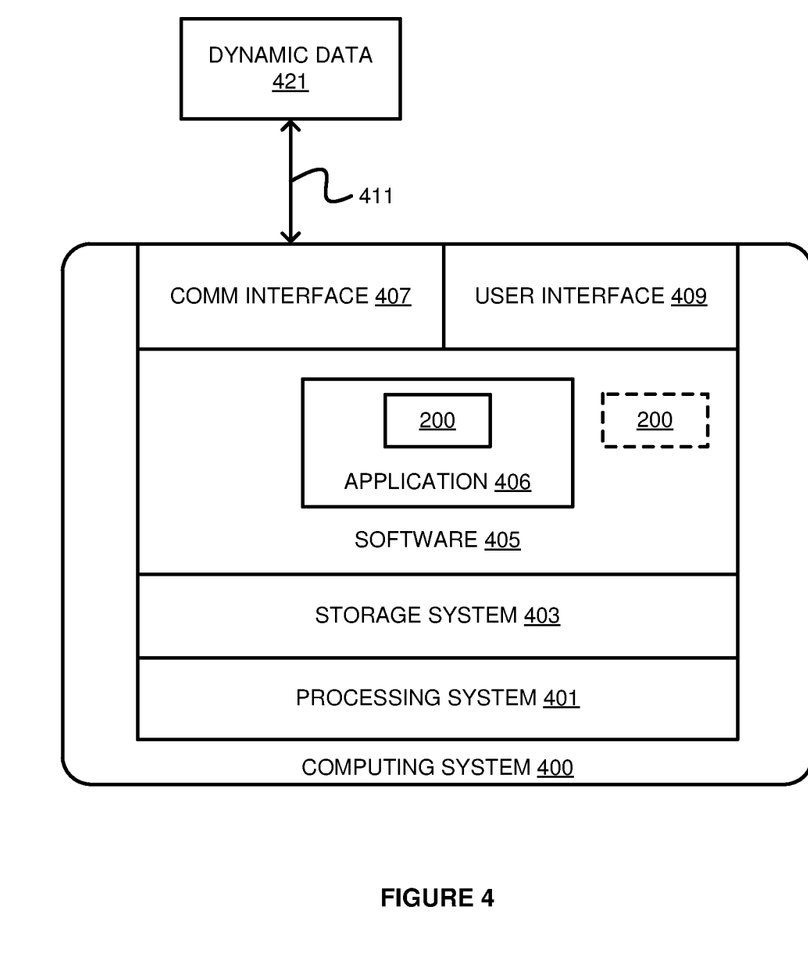
FIG. 4 is a block diagram that illustrates a computing system.

Referring now to FIG. 4, a block diagram that illustrates computing system 400 in an exemplary implementation is shown. Computing system 400 provides an example of computing systems 101, 130, or any computing system that may be used to execute security process 200 or variations thereof although such systems could use alternative configurations. Computing system 400 includes processing system 401, storage system 403, software 405, communication interface 407, and user interface 409. Software 405 includes application 406 which itself includes security process 200. Security process 200 may optionally be implemented separately from application 406.

Computing system 400 may be representative of any computing apparatus, system, or systems on which application 406 and security process 200 or variations thereof may be suitably implemented. Examples of computing system 400 include mobile computing devices, such as cell phones, tablet computers, laptop computers, notebook computers, and gaming devices, as well as any other type of mobile computing devices and any combination or variation thereof. Note that the features and functionality of computing system 400 may apply as well to desktop computers, server computers, and virtual machines, as well as any other type of computing system, variation, or combination thereof.

Computing system 400 includes processing system 401, storage system 403, software 405, communication interface 407, and user interface 409. Processing system 401 is operatively coupled with storage system 403, communication interface 407, and user interface 409. Processing system 401 loads and executes software 405 from storage system 403. When executed by computing system 400 in general, and processing system 401 in particular, software 405 directs computing system n 400 to operate as described herein for security process 200 or variations thereof. Computing system 400 may optionally include additional devices, features, or functionality not discussed herein for purposes of brevity.

Referring still to FIG. 4, processing system 401 may comprise a microprocessor and other circuitry that retrieves and executes software 405 from system 403. Processing system 401 may be implemented within a single processing device but may also be distributed across multiple processing devices or sub-systems that cooperate in executing program instructions. Examples of processing system 401 include general purpose central processing units, application specific processors, and logic devices, as well as any other type of processing device, combinations, or variations thereof.

Storage system 403 may comprise any computer readable media or storage media readable by processing system 401 and capable of storing software 405. Storage system 403 may include volatile and nonvolatile, removable and non-removable media implemented in any method or technology for storage of information, such as computer readable instructions, data structures, program modules, or other data. Storage system 403 may be implemented as a single storage device but may also be implemented across multiple storage devices or sub-systems co-located or distributed relative to each other. Storage system 403 may comprise additional elements, such as a controller, capable of communicating with processing system 401. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, processing system 401 loads and executes portions of software 405, such as security process 200, to facilitate network security analysis and attack response. Software 405 may be implemented in program instructions and among other functions may, when executed by computing system 400 in general or processing system 401 in particular, direct computing system 400 or processing system 401 to receive a copy of network traffic, perform deep analysis on the copy of network traffic, and generate security data points based on the deep analysis. Software 405 may further direct computing system 400 or processing system 401 to provide the security data points to an active inline security device, wherein the active inline security device compares incoming network traffic to the security data points to detect security events.

Software 405 may include additional processes, programs, or components, such as operating system software or other application software. Examples operating systems include Windows®, iOS®, and Android®, as well as any other suitable operating system. Software 405 may also comprise firmware or some other form of machine-readable processing instructions executable by processing system 401.

In general, software 405 may, when loaded into processing system 401 and executed, transform computing system 400 overall from a general-purpose computing systems into a special-purpose computing system customized to facilitate network security analysis and attack response as described herein for each implementation. For example, encoding Aware 405 on storage system 403 may transform the physical structure of storage system 403. The specific transformation of the physical structure may depend on various factors in different implementations of this description. Examples of such factors may include, but are not limited to the technology used to implement the storage media of storage system 403 and whether the computer-readable storage media are characterized as primary or secondary storage.

In some examples, if the computer-readable storage media are implemented as semiconductor-based memory, software 405 may transform the physical state of the semiconductor memory when the program is encoded therein. For example, software 405 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 400 is generally intended to represent a computing system with which software 405 is deployed and executed in order to implement application 406 and/or security process 200 (land variations thereof). However, computing system 400 may also represent any computing system on which software 405 may be staged and from where software 405 may be distributed, transported, downloaded, or otherwise provided to yet another computing system for deployment and execution, or yet additional distribution. For example, computing system 400 could be configured to deploy software 405 over the internet to one or more client computing systems for execution thereon, such as in a cloud-based deployment scenario.

Communication interface 407 may include communication connections and devices that allow for communication between computing system 400 and other computing systems (not shown) or services, over a communication network. 411 or collection of networks. In some implementations, communication interface 407 receives dynamic data 421 over communication network 411. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 409 may include a voice input device, a touch input device for receiving a gesture from a user, a motion input device for detecting g non-touch gestures and other motions by a user, and other comparable input devices and associated processing elements capable of receiving user input from a user. Output devices such as a display, speakers, haptic devices, and other types of output devices may also be included in user interface 409. In some examples, user interface 409 could include a touch screen capable of displaying a graphical user interface that also accepts user inputs via touches on its surface. The aforementioned user input devices are well known in the art and need not be discussed at length here. User interface 409 may also include associated user interface software executable by processing system 401 in support of the various user input and output devices discussed above. Separately or in conjunction with each other and other hardware and software elements, the user interface software and devices may provide a graphical user interface, a natural user interface, or any other kind of user interface. User interface 409 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate network security analysis and attack response, the method comprising:
    in a passive analysis system:
        receiving a copy of network traffic;
        performing deep analysis on the copy of network traffic without regard for latency to identify one or more malicious behavioral patterns of one or more clients over time by analyzing connection behavior of the one or more clients when interacting with at least one server, wherein analyzing the connection behavior of the one or more clients comprises determining an order and manner in which the one or more clients retrieve content from the at least one server;
        generating one or more security data points based on the connection behavior of the one or more clients, wherein the one or more security data points comprise one or more fingerprints of behavior that describe the one or more malicious behavioral patterns of the one or more clients; and
        providing the one or more security data points to an active inline security device as the one or more security data points are generated, wherein the active inline security device compares incoming network traffic to the one or more security data points to detect one or more security events by performing a pattern matching function to comply with a maximum latency restriction for the active inline security device that matches the one or more fingerprints of behavior to the incoming network traffic to detect the one or more security events.

2. The method of claim 1 wherein the active inline security device blocks one or more packets upon detection of the one or more security events.

3. The method of claim 1 wherein analyzing the connection behavior of the one or more clients comprises analyzing frequency of requests sent from the one or more clients.

4. The method of claim 1 wherein analyzing the connection behavior of the one or more clients comprises identifying one or more transitions from idle to active on one or more connections of the one or more clients with the at least one server.

5. The method of claim 1 wherein providing the one or more security data points to the active inline security device comprises asynchronously feeding the one or more security data points to the active inline security device over a high speed communication bus.

6. The method of claim 1 wherein determining the order and manner in which the one or more clients retrieve the content from the at least one server comprises determining the order and manner in which the one or more clients parse hypertext markup language code when retrieving a webpage.

7. The method of claim 1 wherein the one or more security data points describe unique behavior of the one or more clients when interacting with the at least one server.

8. One or more computer-readable storage media having program instructions stored thereon to facilitate network security analysis and attack response, wherein the program instructions, when executed by a passive analysis system, direct the passive analysis system to at least:
    receive a copy of network traffic;
    perform deep analysis on the copy of network traffic without regard for latency to identify one or more malicious behavioral patterns of one or more clients over time by analyzing connection behavior of the one or more clients when interacting with at least one server, wherein analyzing the connection behavior of the one or more clients comprises determining an order and manner in which the one or more clients retrieve content from the at least one server;
    generate one or more security data points based on the connection behavior of the one or more clients, wherein the one or more security data points comprise one or more fingerprints of behavior that describe the one or more malicious behavioral patterns of the one or more clients; and
    provide the one or more security data points to an active inline security device as the one or more security data points are generated, wherein the active inline security device compares incoming network traffic to the one or more security data points to detect one or more security events by performing a pattern matching function to comply with a maximum latency restriction for the active inline security device that matches the one or more fingerprints of behavior to the incoming network traffic to detect the one or more security events.

9. The one or more computer-readable storage media of claim 8 wherein the active inline security device blocks one or more packets upon detection of the one or more security events.

10. The one or more computer-readable storage media of claim 8 wherein analyzing the connection behavior of the one or more clients comprises analyzing frequency of requests sent from the one or more clients.

11. The one or more computer-readable storage media of claim 8 wherein analyzing the connection behavior of the one or more clients comprises identifying one or more transitions from idle to active on one or more connections of the one or more clients with the at least one server.

12. The one or more computer-readable storage media of claim 8 wherein the program instructions direct the passive analysis system to provide the one or more security data points to the active inline security device by directing the passive analysis system to asynchronously feed the one or more security data points to the active inline security device over a high speed communication bus.

13. The one or more computer-readable storage media of claim 8 wherein determining the order and manner in which the one or more clients retrieve the content from the at least one server comprises determining the order and manner in which the one or more clients parse hypertext markup language code when retrieving a webpage.

14. The one or more computer-readable storage media of claim 8 wherein the security data points describe unique behavior of the one or more clients when interacting with the at least one server.

15. A network security system comprising:
    a passive analysis system having a first communication interface and a first processor; and an active inline security device having a second communication interface and a second processor, and wherein the active inline security device is logically positioned between at least one client device and at least one server to intercept network traffic;

the passive analysis system configured to:

receive, via the first communication interface, a copy of network traffic between the at least one client device and the at least one server;

perform, using the first processor, deep analysis on the copy of network traffic without regard for latency to identify one or more malicious behavioral patterns of the at least one client device over time by analyzing connection behavior of the at least one client device when interacting with the at least one server, wherein analyzing the connection behavior of the at least one client device comprises determining an order and manner in which the at least one client device retrieves content from the at least one server;

generate one or more security data points based on the connection behavior of the at least one client device, wherein the one or more security data points comprise one or more fingerprints of behavior that describe the one or more malicious behavioral patterns of the at least one client device; and transmit, via the first communication interface, the one or more security data points to the active inline security device as the one or more security data points are generated; and the active inline security device configured to:

receive, via the second communication interface, the one or more security data points transmitted from the passive analysis system as the one or more security data points are generated; and compare, using the second processor, incoming network traffic to the one or more security data points to detect one or more security events by performing a pattern matching function to comply with a maximum latency restriction for the active inline security device that matches the one or more fingerprints of behavior to the incoming network traffic to detect the one or more security events.

16. The network security system of claim 15 wherein the active inline security device is further configured to block one or more packets upon detection of the one or more security events.

17. The network security system of claim 15 wherein analyzing the connection behavior of the at least one client device comprises analyzing frequency of requests sent from the at least one client device.

18. The network security system of claim 15 wherein analyzing the connection behavior of the at least one client device comprises identifying one or more transitions from idle to active on one or more connections of the at least one client device with the at least one server.

19. The network security system of claim 15 wherein the passive analysis system configured to transmit the one or more security data points to the active inline security device comprises the passive analysis system configured to asynchronously feed the one or more security data points to the active inline security device over a high speed communication bus.

20. The network security system of claim 15 wherein determining the order and manner in which the at least one client device retrieves the content from the at least one server comprises determining the order and manner in which the at least one client device parses hypertext markup language code when retrieving a webpage.

* * * * *